United States Patent Office 2,898,133
Patented Aug. 4, 1959

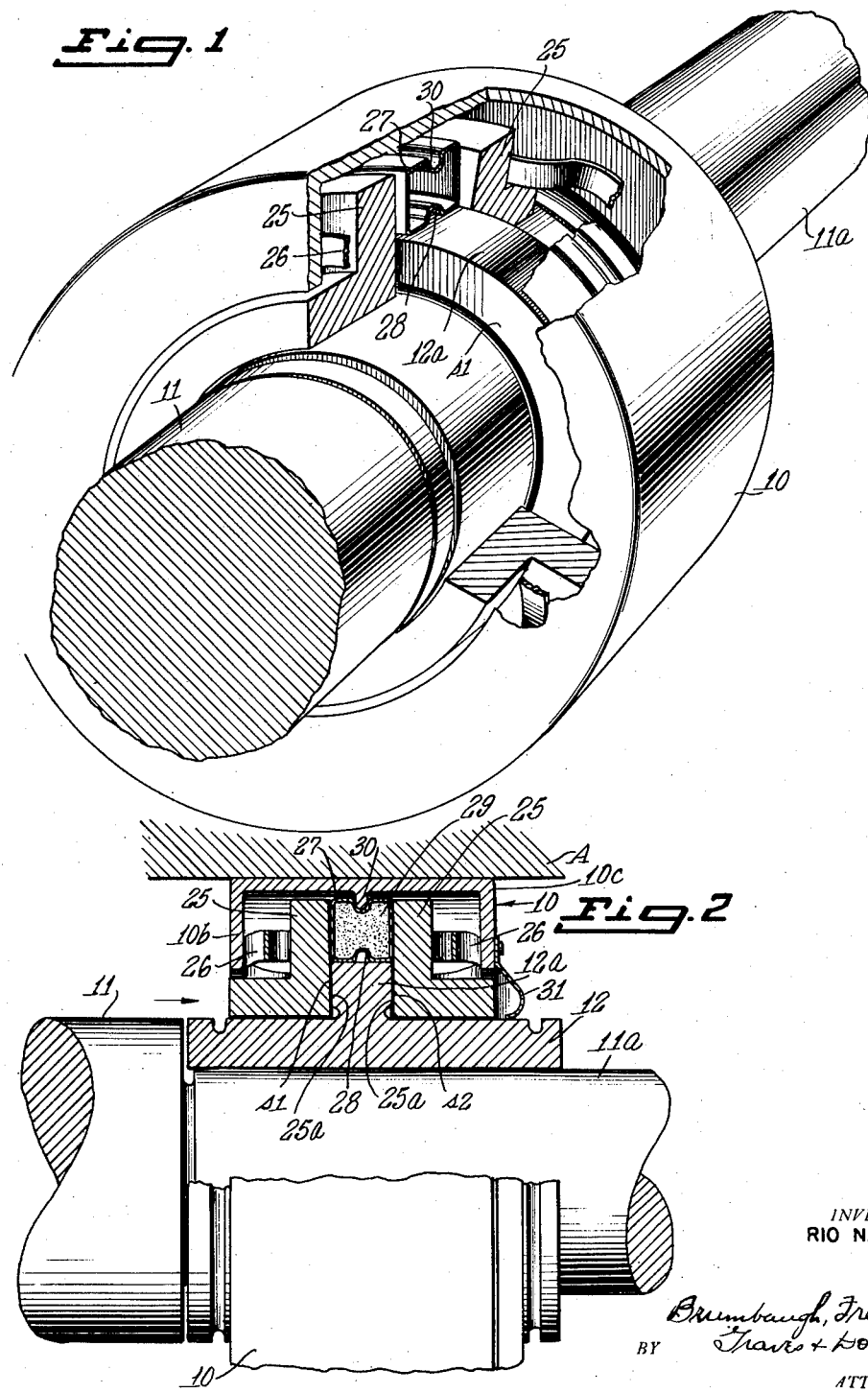

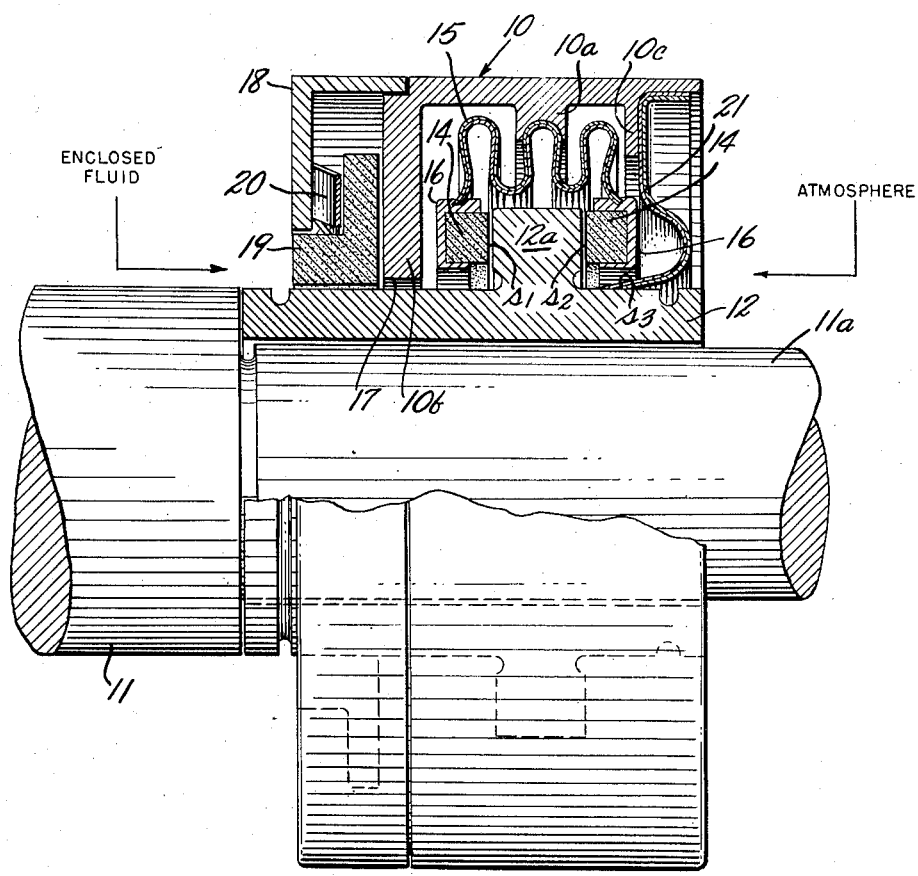

2,898,133

SEAL FOR A ROTATING SHAFT

Rio N. Mirza, Northport, N.Y., assignor to Fairchild Engine and Airplane Corporation, Bay Shore, N.Y., a corporation of Maryland Application May 17, 1957, Serial No. 659,788

19 Claims. (Cl. 286—7)

This invention relates to a novel type of sealing device for a shaft which prevents the leakage of a gaseous or liquid fluid into or out of a housing through which the shaft passes and, more particularly, to a sealing device of that general organization which provides an effective seal against leakage of the fluid both when the shaft is rotating and when the shaft is at rest.

Carbon, bronze and other seals have been widely used for preventing the leakage of a confined fluid from a housing through which a rotating shaft passes. In order to provide a longer life for such seals, as well as to afford an effective seal during operating conditions, conventional types of sealing devices have been for the most part designed to provide a more effective seal during the rotation of the shaft than when the shaft is at rest, with the result that leakage may occur when the shaft is at rest. In fact, in the case of some fluids, such as Freon or other vapor cooling fluids and gases, the problem of maintaining an effective seal under static conditions has been solved only by enclosing the entire system, including the operating unit and the drive therefor, within a sealed housing. Besides the inconvenience and cost of providing such a sealed system, an important limitation of such sealed systems is that the operating unit must ordinarily be driven by an electrical motor, notwithstanding the fact that in many instances an electrical drive may be either undesirable or impractical, for example, due to the unavailability of electrical power in certain areas. By providing an effective seal for the housing under both static conditions and operating conditions, the sealing device of the present invention obviates the necessity of enclosing the operating parts of the system within a sealed housing.

In the sealing device of the present invention, the movement of a sealing element toward and away from sealing position is controlled automatically by expandable and contractable temperature sensitive means, and this sealing element is urged toward sealing position under considerable pressure when the shaft is at rest. However, lest the seal impose an excessive load on the operating shaft and the drive means therefor, the present invention provides means for automatically relieving the pressure exerted by the sealing element when the shaft is driven. As the shaft begins to rotate, heat is generated by the friction produced by the static seal, and the consequent expansion of the temperature sensitive means imparts movement to the sealing element toward an inoperative position, thereby relieving the pressure exerted by the sealing element against the rotation of the shaft. In moving toward an inoperative position, the sealing element generates less heat, and eventually a position of equilibrium or stability is reached at which the friction produced by the sealing element is substantially reduced without ever completely losing the benefit of the sealing action of the sealing element. In other words, under normal operating conditions, the sealing element will return to provide a light loading contact which does not act to unduly impede the rotation of the shaft. When the rotation of the shaft stops, the contraction of the temperature sensitive component restores the sealing element to a more effective sealing position. In this condition the sealing load is further compounded by the pressure of the fluid entrapped in or excluded from the housing, which fluid acts on and builds up pressure against the sealing element.

The expandable and contractable temperature sensitive component may take various forms, but it is particularly important that it possess a high degree of sensitivity so that the sealing element functions uniformly and dependably. A high degree of sensitivity may be obtained by utilizing an hermetically sealed housing or container packed with an expandable and contractable temperature sensitive substance, such as a hydro-carbon wax, as the means for imparting automatically the desired movement to the sealing element; in this case the temperature conductivity of the substance would be considerably increased by the addition of a powdered metal. A high degree of sensitivity may also be obtained by utilizing a bi-metallic laminated diaphragm or laminated coil spring for the same purpose.

Although this automatically controlled sealing element will afford an adequate seal both when the shaft is rotating and when the shaft is at rest, nevertheless it may be found desirable to utilize an auxiliary seal in series therewith to provide additional sealing action under both static and operating conditions of the shaft. A particular advantage of such an additional carbon seal in series is that it limits the leakage through the temperature controlled sealing element, particularly when the latter is expanded beyond the stabilized condition, for example during transients resulting from momentary increases in temperature during starting.

For a complete understanding of the present invention, reference may be had to the detailed description of the invention which follows and to the accompanying drawings wherein:

Fig. 1 is an isometric view, with parts broken away, of the preferred embodiment of the sealing device of the present invention;

Fig. 2 is an elevation view thereof with the upper portion of the sealing device shown in section; and Fig. 3 is a view similar to Fig. 2, but illustrating an alternative embodiment of the invention.

Referring to the drawings and especially to Figs. 1 and 2, a cylindrical retainer housing 10 for the sealing apparatus is accommodated within an opening of the main housing A within which a fluid is to be confined or from which a fluid is to be excluded. The retainer housing 10 is provided with end walls 10b, 10c having enlarged openings therein. A rotating shaft 11 is accommodated within the main housing, and the shaft 11 is provided with an extension 11a of reduced diameter which passes through an opening in the main housing A, so that, for example, the shaft can be connected to a drive source (not shown).

The portion 11a of the shaft 11 is provided with a sleeve 12 which is fixed to the outer periphery of the shaft so that the sleeve rotates with the shaft. A rim or collar 12a is formed integrally with and continuously around the outer periphery of the sleeve 12, and the collar 12a is disposed between two circular carbon seal rings 25 which are accommodated within the interior of the cylindrical retainer housing 10. The faces 25a of the carbon sealing rings 25 are pressed by wavy springs 26 against the hardened, flat surfaces s1 and s2 formed on opposite sides of the rim or collar 12a.

An annular, hollow capsule or ring 27 made of resilient steel surrounds the outer periphery of the collar or rim 12a and is interposed between and in contact with the faces 25a of the carbon seal rings 25. In the form shown, the hollow annular capsule or housing 27 is of substantially square or rectangular cross-section. The inner and outer sides thereof are provided with at least one groove or corrugation 28 which permits the capsule or ring to be expanded axially under pressure by a temperature sensitive substance, generally designated 29, packed therein under pressure. The engagement of an internally formed ridge 30 with the groove or corrugation 28 formed in the outer surface of the hollow capsule or ring 27 helps to prevent axial displacement of the capsule or ring within the retainer housing 10. The hollow capsule or ring 27 is tightfitted within the retainer housing 10 so as to prevent the passage or flow therebetween of fluid into or out of the housing, and a continuous weld between the ridge 30 and the groove 28 may be provided for to insure that there is no leakage therebetween.

The hermetically sealed capsule or ring 27 is filled under pressure with a temperature sensitive substance, preferably a hydro-carbon wax or other substance capable of "state-change" from a solid to a fluid at specific operating temperatures. Such waxes can be mixed so that "state-change" will occur consistently at a specific temperature over a fairly wide range. Other substances that might be used include finely divided metallic powders, for the purpose of increasing the rate of heat transfer through the hydro-carbon wax or other substance with "state-change" characteristics in the temperature range desired. The term "state-change" is intended to define a condition of change from solid to liquid or liquid to vapor (or in reverse order), wherein most substances undergo a substantial change of volume at a critical point. For example, a hydro-carbon wax in solidified form would, under the influence of temperature, considerably increase its volume at the point-of-change to a liquid. Under such conditions it is capable of generating very high pressure forces to the sides of a containing vessel which it completely filled in solid form.

An annular flexible metal diaphragm 31 is attached to the exterior side of the retainer housing 10 in order to provide an auxiliary sealing element in series with the carbon seal rings 25. The inner periphery of the diaphragm 31 is curved inwardly and engages the outer periphery of the rotatable sleeve 12. The purpose of this diaphragm is to provide a quick closure at its lip or inner periphery so that leakage will be avoided, particularly before a stabilized position of the sealing rings is reached. Preferably the diaphragm 31 may be a bi-metallic lamination similar to the diaphragm 21 shown in the embodiment of the invention illustrated in Fig. 3, so that in operation the heat generated by the frictional contact of the lip with the sleeve will be sufficient to expand the diameter of the opening in the diaphragm to substantially reduce the friction between the diaphragm and the sleeve during the operation of the shaft. For a more detailed explanation of the diaphragm 31, reference may be had to the description of the bi-metallic diaphragm 21 which appears below.

Turning now to a description of the operation of the embodiment of the invention illustrated in Figs. 1 and 2 of the drawings, it will be assumed for purposes of this explanation that liquid or gas pressure is sealed within the main housing A and acting against the sealing device in the direction indicated by the arrow in Fig. 2, so that the function of the sealing device of the present invention is to prevent the leakage of this fluid from the housing to the atmosphere. Assuming that the shaft 11 is at rest, the sealing surfaces 25a of the two carbon sealing rings 25 are pressed by the springs 26 tightly against the surfaces s1 and s2 of the rim or collar 12a of the sleeve 12, providing an effective seal by virtue of the static load. This static load is further increased by the action of trapped pressure which acts on the outward walls 25 of the seals, and such trapping will result from the rapid action of diaphragm 31 providing a closure under conditions where no heat is being generated by its friction against sleeve 12. A most effetcive seal under stationary conditions will therefore result. Under dynamic conditions, the high contact pressure between the faces 25a and s1, on the one hand, and 25a and s2, on the other, will quickly generate a high surface temperature which is transmitted to the hollow capsule or ring 27 from its contact with the faces 25a of the carbon seals and from its contact with the outer periphery of the collar or rim 12a. This heat generated will quickly result in a change in state of the hydro-carbon wax from a solid to a liquid assisted by metal powder to increase conductivity, and the consequent expansion of the wax expands the hollow capsule or ring 27 axially so as to reduce the frictional contact between the carbon sealing rings 25 and the surfaces s1 and s2 of the rim or collar 12a.

As the pressure exerted by the sealing rings 25 against the surfaces s1 and s2 of the sleeve is relieved, less friction is generated, and some time after the shaft has reached a constant speed of rotation, a position of equilibrium is reached, at which the friction generated between the contacting surfaces of the sealing rings 25 and the sleeve 12 is substantially reduced without ever completely losing the benefit of the sealing action therebetween. Under dynamic operating conditions, the lighter load which the frictional contact produces does not unduly impede the rotation of the shaft, or result in excessive wear of the seal surfaces. At the same time, the axial sealing surfaces between the outer periphery of the sleeve 12 and the inner periphery of the sealing rings 25 serve as a floating seal under dynamic conditions, since the sealing rings 25 are restrained only by wave springs 26, allowing the sealing rings to seek a freely centered position relative to the sleeve 12 during rotation of the shaft 11a and the sleeve 12.

On shutdown and during subsequent cooling, the wax quickly solidifies, thereby contracting, so that the pressure exerted between the sealing surfaces of the carbon rings 25 and the sleeve 12 quickly increases, by virtue of both the spring and fluid pressure, thereby increasing the effectiveness of the seal under static conditions.

An alternative embodiment of the present invention is illustrated in Fig. 3 of the drawings. In the embodiment illustrated in that figure, like the embodiment illustrated in Figs. 1 and 2, the rim or collar 12a of the sleeve 12 is disposed between two circular carbon sealing rings 14 mounted in holders 16 which are carried at opposite ends of a bellows-type diaphragm 15 constituting a temperature sensitive element in this particular arrangement. Both the bellows-type diaphragm 15 and the carbon seals 14 completely encircle the shaft 11a and the sleeve 12 carried thereby. The outer periphery of the bellows-type diaphragm 15 is affixed, about midway between its ends, to the curved inner edge of a wall 10a formed integrally with the inner periphery of the housing 10. For temperature sensitivity, the diaphragm 15 is formed of a laminated bi-metallic temperature sensitive material. Since the outer surface of the diaphragm is anchored to the housing 10, such sensitivity can be provided by the coefficient of expansion of the material forming the one lamination being less than the coefficient of expansion of the material forming the other lamination.

The inner end of the housing 10 is formed by a wall 10b. This wall 10b is provided with a restricted opening 17 which surrounds the outer periphery of the sleeve 12. However, there is sufficient clearance between the sleeve and the opening to permit the shaft 11a to rotate freely. A retainer ring 18 is affixed to the inner end of the housing 10 immediately adjacent the wall 10b thereof, and the retainer ring 18 carries a floating carbon seal 19 which surrounds the outer periphery of the sleeve 12. The carbon seal 19 is supported from the retainer ring by a wave spring 20 which makes it possible for the carbon wheel 19 to seek a freely centered position relative to the sleeve 12 during the rotation of the shaft 11a and the sleeve 12.

There is also stationed at the outer end of the housing 10 a temperature sensitive deflectable diaphragm 21, preferably of bi-metallic material, which surrounds the sleeve 12. The outer periphery of the diaphragm 21 is affixed to the partition 10c of the housing 10 and to the inner surface of the housing, and the curved inner periphery of the diaphragm 21 is engageable with the sleeve 12 under certain conditions to be described below. Preferably, the coefficient of expansion of the material forming the lamination of the diaphragm 21 which is affixed to the housing 10 is less than the coefficient of expansion of the material forming the other lamination, which other lamination incidentally is the material which is adapted to engage the outer surface of the sleeve 12 in the deflected condition of the diaphragm.

Turning now to the operation of the sealing apparatus of the present invention, the bi-metallic, temperature sensitive, bellows-type diaphragm 15 under static conditions of the shaft 11a will be axially contracted, thereby urging the carbon seals 14 into a heavily loaded sealing contact with the surfaces $s1$ and $s2$ of the collar 12a. Leakage of the confined fluid around the outer periphery of the diaphragm 15 is impossible because the outside of the diaphragm 15 is joined to the inwardly projecting wall 10a of the housing. Likewise, leakage of the fluid through the diaphragm 15 is impossible because of the sealing contact of the carbon seals 14 with the surfaces $s1$ and $s2$. Furthermore, under static conditions of the shaft 11a, the inner periphery of the bi-metallic temperature sensitive sealing element is in sealing contact at $s3$ with the outer periphery of the sleeve 12. At this time, the pressure built up by leakage of the fluid past the floating seal 19 and trapped by diaphragm seal 21, acts also on the external surface area of seals 16, thereby increasing the static sealing load at surfaces $s1$ and $s2$ by a very substantial amount and contributing to the overall fluid tightness of the sealing assembly. When the shaft 11a is rotating, the heat generated by friction at the sealing areas $s1$ and $s2$ will cause the bellows-type diaphragm 15 to axially expand, moving the carbon seals 14 momentarily out of contact with the surfaces $s1$ and $s2$. Furthermore, the heat generated by the engagement of the sealing diaphragm 21 with the surface $s3$ of the sleeve will produce a deflection of the sealing diaphragm 21, deflecting the inner periphery of the diaphragm away from the outer periphery of the shaft. Thus the temperature increase due to the friction of rotation decreases the contact pressure at the sealing areas $s1$, $s2$ and $s3$ so that the seals 15, 21 although completely effective due to heavy loading pressure while the shaft is at rest, will rapidly move away and not interfere with the free rotation of the shaft on starting.

Actually, under operating conditions, the temperature sensitive sealing elements will finally seek a stabilized position of light contact with the respective sealing surfaces, which contact will be sufficient to generate a predetermined temperature. For example, the sensitivity of such diaphragms may be such that the seals remain in relatively heavy contact with the sealing surfaces $s1$, $s2$ and $s3$ up to a temperature of perhaps 200° F. Thereafter, they would retract, resulting in a momentary clearance between the seals and the sealing surface until again cooled to a lower point, after which they would provide a substantially lighter contact than the contact when the shaft is at rest. In this manner, a stabilized operating condition is quickly reached.

The floating carbon seal 19 is shown in this arrangement as an additional sealing protection provided in series. It affords protection particularly during the rotation of the shaft 11a before the stabilized condition of the temperature sensitive sealing elements is reached, or during transients resulting from momentary temporary increases in temperature.

On cooling after a shutdown, the temperature sensitive element will rapidly contract and thereby increase the sealing effectiveness at surfaces $s1$, $s2$ and $s3$. This cooling action may be accelerated by heat absorbed by fluid seeping past the carbon seal 19. Moreover, the pressure of this fluid against the diaphragms 15, 21 will tend to deflect them in such manner as to also increase the sealing action.

The invention has been shown in preferred forms and by way of example only, and obviously many variations and modifications may be made therein without departing from the spirit of the invention. The invention, therefore, is not to be limited to any specified form or embodiment, except insofar as such limitations are set forth in the claims.

I claim:

1. A sealing device for preventing leakage of a fluid into or out of a housing through which a rotating shaft extends comprising means for establishing an effective seal between the housing and the shaft when the shaft is at rest, said seal establishing means offering resistance to the rotation of the shaft, and temperature sensitive means controlled by the heat generated by friction caused by said resistance to decrease the resistance to the rotation of the shaft when the shaft is rotating.

2. A sealing device for preventing leakage of a fluid into or out of a housing through which a rotating shaft extends comprising means for establishing an effective seal between the housing and the shaft when the shaft is at rest, said seal establishing means offering resistance to the rotation of the shaft so that heat is generated when the shaft is rotating, and temperature sensitive means in heat exchange relation to the means for establishing an effective seal which acts in response to the heat generated when the shaft is rotating to decrease the resistance which the sealing means imposes on the rotation of the shaft.

3. A sealing device for preventing leakage of a fluid into or out of a housing through which a rotating shaft extends comprising a movable sealing element surrounding the rotatable shaft, a companion element surrounding the shaft and having a surface formed thereon with which said movable sealing element is in frictional contact, one of said elements being affixed to the rotating shaft so as to rotate therewith and the other of said elements being independent of the rotating shaft, said sealing element normally being urged under pressure with said surface to provide an effective seal when the shaft is at rest, the frictional contact between said elements generating heat when the shaft is rotating, and temperature sensitive means in heat exchange relationship with at least one of said elements, said temperature sensitive means acting to relieve the frictional contact between said elements while the shaft is rotating and to increase the frictional contact between the said elements when the shaft is at rest.

4. A sealing device for preventing leakage of a fluid into or out of a housing through which a rotating shaft extends comprising a movable sealing element surrounding the rotatable shaft, a companion element surrounding the shaft and having a surface formed thereon with which said movable sealing element is in frictional contact, one of said elements being affixed to the rotating shaft so as to rotate therewith and the other of said elements being independent of the rotating shaft, said sealing element normally being urged into frictional contact with said surface to provide an effective seal when the shaft is at rest, said frictional contact generating heat when the shaft is rotating, and an expandable and contractable temperature sensitive means in heat exchange relationship with at least one of said elements, the expansion of said temperature sensitive means caused by the generated heat when the shaft is rotating acting on said movable sealing element to relieve the frictional contact between said elements.

5. A sealing device as set forth in claim 4 wherein a reduction in the heat generated by the frictional contact between said elements causes said temperature sensitive means to contract, said contraction of the temperature sensitive means allowing an increase in the frictional contact between said elements.

6. A sealing device for a rotatable shaft which extends outside of a sealed housing comprising an element having a sealing surface which surrounds the shaft and an expandable and contractable temperature sensitive element carrying a sealing surface which surrounds the shaft, one of the two recited elements being rotatable with the shaft and the other being independent of the shaft, the sealing surfaces being maintained in sealing contact with each other in the contracted condition of the temperature sensitive element when the shaft is at rest and being movable out of sealing contact with each other in the expanded condition of the temperature sensitive element, the expansion being caused by the heat of friction generated by the sealing surfaces when the shaft is rotating.

7. A sealing device for a rotating shaft comprising a rim affixed to said shaft and surrounding the shaft, an axially movable sealing ring surrounding said shaft, means for urging the sealing ring axially into sealing engagement with a surface of said rim, the engagement of said sealing ring with said surface of said rim establishing an effective seal around the rotating shaft, a stationary housing surrounding said shaft, and an annular temperature sensitive element retained within said housing for imparting axial movement to the sealing ring, the temperature sensitive element being in heat exchange relationship with the surfaces forming the seal so that variations in the heat generated by the friction therebetween expands or contracts the temperature sensitive element, the expansion of the temperature sensitive element relieving the frictional contact between said sealing ring and said rim and the contraction of said temperature sensitive element increasing the frictional contact between said sealing ring and said rim.

8. A sealing device for a rotating shaft comprising a movable sealing ring surrounding said shaft, means encircling said shaft and forming a companion surface for said sealing ring, spring means for urging the sealing ring against said companion surface under pressure, the engagement of said sealing ring with said companion surface establishing an effective seal around said rotating shaft, which seal resists the rotation of said shaft, and an expandable and contractable temperature sensitive means in heat exchange relationship with the contacting surfaces of the sealing ring and the companion surface, said temperature sensitive means controlling the pressure exerted by said sealing ring against said companion surface when the shaft is rotating.

9. A sealing device for a rotating shaft comprising a rim affixed to said shaft and surrounding the shaft, an axially movable sealing ring adjacent said rim and in frictional contact therewith to establish an effective seal around said shaft when said shaft is at rest, and a hollow resilient container filled with a substance which is expandable and contractable in response to temperature changes, said hollow housing being in heat exchange relationship with the contacting surfaces of said sealing ring and rim so that the heat generated by the friction between said contacting surfaces when the shaft is rotating will cause said container to expand, the expansion of said container acting to decrease the frictional contact between said surfaces.

10. A sealing device for a rotating shaft comprising a rim formed on said shaft and surrounding said shaft, an axially movable sealing ring independent of said shaft but surrounding said shaft, spring means urging said sealing ring into contact with said rim under pressure to establish an effective seal around the shaft when the shaft is at rest, an annular hollow housing made of a resilient material surrounding said rim and adjacent said sealing ring, said hollow housing containing a substance which is expandable and contractable in response to temperature changes, and retaining means for said annular hollow housing, whereby the heat generated by the contacting surfaces of said sealing ring and rim causes said annular hollow housing to expand axially, urging said sealing ring in opposition to the pressure exerted by said spring means to relieve the pressure between the sealing ring and the rim when the shaft is rotating, and the spring increasing the frictional contact between the sealing ring and the rim when the annular hollow housing contracts axially in response to a decrease in the heat generated.

11. A sealing device for a rotatable shaft which extends outside of a sealed housing comprising a circular collar around the rotatable shaft, a sealing surface formed on the collar, an expandable and contractable temperature sensitive element surrounding the rotatable shaft, a sealing surface carried by the temperature sensitive element, one of the sealing surfaces being rotatable with the shaft and the other being stationary, the sealing surfaces being maintained in sealing contact with each other in the contracted condition of the temperature sensitive element when the shaft is at rest and being movable out of sealing contact with each other in the expanded condition of the temperature sensitive element, the expansion being caused by the heat of friction generated by the sealing surfaces when the shaft is rotating.

12. A sealing device for a rotating shaft comprising an expandable and contractable temperature sensitive element surrounding the shaft, sealing means carried at both ends of the expandable and contractable temperature sensitive element, and a pair of sealing surfaces surrounding the shaft, the sealing means and the sealing surfaces moving relative to each other during the rotation of the shaft, said sealing means being in tight sealing contact with the sealing surfaces when the shaft is at rest and being movable out of tight sealing contact with the sealing surfaces when the temperature sensitive element is expanded by the heat of friction generated by the engagement of the sealing means with the sealing surfaces.

13. A sealing device for a rotating shaft comprising a housing through which the shaft passes, an axially expandable and contractable temperature sensitive element mounted within said housing, a sealing surface carried by the temperature sensitive element, and a sealing surface carried by the rotating shaft, the sealing surfaces of the shaft and the temperature sensitive element being in sealing engagement when the shaft is at rest and being movable out of sealing engagement when the temperature sensitive element is axially expanded by the heat generated by the frictional engagement of the sealing surfaces.

14. A sealing device for a rotatable shaft comprising a housing through which the shaft extends, an axially expandable and contractable temperature sensitive element surrounding the shaft, the outer periphery of the temperature sensitive element being supported from the housing intermediate the opposite ends of the temperature sensitive element, annular seals surrounding the shaft on both sides the temperature sensitive element, sealing means carried by the rotatable shaft, said sealing means being disposed between the annular seals, the annular seals being in tight sealing engagement with the sealing means carried by the shaft when the shaft is at rest and being movable out of sealing engagement therewith when the temperature sensitive element is axially expanded by heat generated by the frictional engagement between the annular seals and the sealing means.

15. A sealing device as set forth in claim 14 wherein the temperature sensitive element comprises at least two laminations of materials having different coefficients of expansion.

16. A sealing device as set forth in claim 14 including a carbon seal in series with the temperature sensitive element.

17. A sealing device as set forth in claim 14 including a second temperature sensitive element supported from the housing and engageable with the outer periphery of the shaft when the shaft is at rest and deflectable away from the outer periphery of the shaft by the heat generated by the frictional engagement between the shaft and the second temperature sensitive element.

18. A sealing device for a rotating shaft comprising radial and axial sealing surfaces carried by the rotating shaft, a sealing ring surrounding the shaft and having radial and axial surfaces complementary to the said radial and axial sealing surfaces carried by the shaft, temperature expandable and contractable means for controlling the movement of said sealing ring toward and away from the radial surface carried by the shaft, thereby controlling the sealing action of the sealing ring under dynamic conditions, and an auxiliary temperature expandable and contractable means engageable with the outer periphery of the shaft to provide an effective seal under static conditions.

19. A sealing device as set forth in claim 18, wherein under static conditions the pressure of the fluid against which the sealing device is intended to be effective acts against said sealing ring, urging the radial surface thereof into sealing engagement with the complementary radial surfaces carried by the rotating shaft.

References Cited in the file of this patent

UNITED STATES PATENTS

| | | |
|---|---|---|
| 1,851,032 | Bischof | Mar. 29, 1932 |
| 2,559,851 | Dean | July 10, 1951 |